J. F. MIDDLETON.
VEHICLE WHEEL.
APPLICATION FILED MAR. 26, 1909.

1,088,356.

Patented Feb. 24, 1914.

WITNESSES

INVENTOR
JAMES F. MIDDLETON
BY
ATTORNEY

UNITED STATES PATENT OFFICE.

JAMES F. MIDDLETON, OF PITTSFIELD, MASSACHUSETTS.

VEHICLE-WHEEL.

1,088,356. Specification of Letters Patent. Patented Feb. 24, 1914.

Application filed March 26, 1909. Serial No. 486,032.

*To all whom it may concern:*

Be it known that I, JAMES F. MIDDLETON, a citizen of the United States of America, residing at Pittsfield, in the county of Berkshire and State of Massachusetts, have invented certain new and useful Improvements in Vehicle-Wheels, of which the following is a specification.

My present invention concerns a vehicle wheel of new and improved construction adapted to absorb the jar and jolt incident to travel, thereby relieving other portions of the vehicle from the usual strains resulting from vibrations transmitted through the wheels.

The invention comprises principally two separate hubs, a separate series of radial spokes secured to each hub, each of the series of spokes being provided with a felly and spaced relatively to the other, a rim movably interposed between the fellies and elastically supported by improved means upon the spokes, and dust shields to protect the rim-supporting mechanism from the admission of injurious substances.

According to my invention the rim portion is normally maintained concentric to the axis of the hubs and adapted to move under yielding resistance in any direction radially thereof by means of a series of tangentially arranged arms secured to the rim and carrying guide-blocks and tension members coacting in opposing relation to a plurality of rigid wedge members or spreaders secured to a corresponding number of spokes in each wheel section, relative rotary movement of the rim and hub portions being provided for.

A further improvement consists in constructing and interconnecting the separate wheel sections engaging opposite sides of the rim in a manner permitting the removal of either section for inspection without disturbing the position of the other and without requiring the removal of the wheel from the axle.

With the foregoing and other objects in view my invention consists in the novel construction, combination and arrangement of parts, as hereinafter set forth, and it will be understood that various additions, omissions, substitutions and changes in the materials, forms, proportions and sizes of the parts and in various details of the device and of its operation may be made without departing from the spirit of my invention as herein disclosed.

Having thus described the general character and purpose of my invention, I will proceed to describe a specific useful form of embodiment thereof in connection with the accompanying drawings, wherein—

Figure 1:
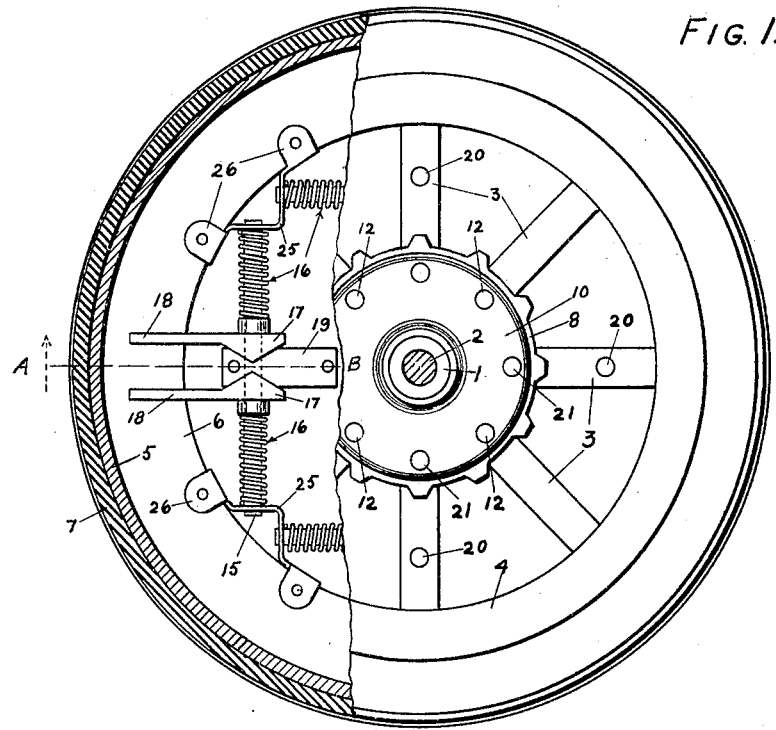
Figure 2:
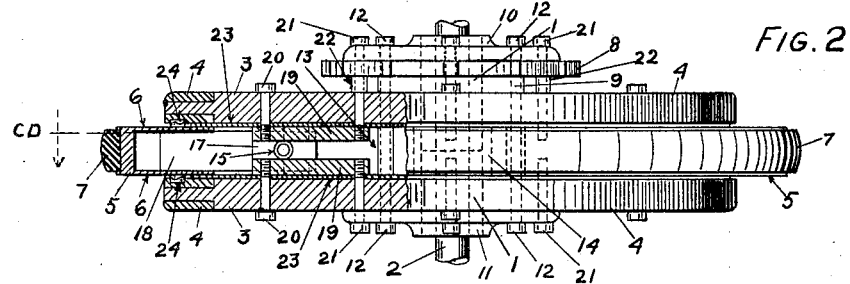
Figure 3:
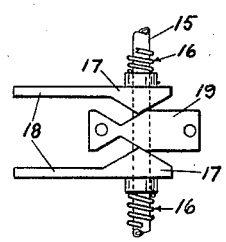

Figure 1 is a side elevation of a vehicle wheel constructed according to my invention, a part thereof being shown in section on the line *c—d* of Fig. 2, extended in a straight course; Fig. 2 is an edge view of the same, a part thereof being shown in section on the line *a—b* of Fig. 1, and Fig. 3 is a detail sectional view showing the relative positions of the guide-blocks and spreaders when brought into play.

As shown, the hub is preferably made in two separate sections 1, 1, of like formation and arranged in parallel upon an axle 2, each section being provided with a series of radial spokes 3, preferably four in number, or multiples thereof, and a separate felly 4 secured to the outer ends of the spokes. Two separate wheel-sections are thus provided having their respective fellies, and series of spokes disposed in spaced parallel planes wherein I prefer to arrange each spoke in one section in opposite relation to a spoke in the other section. Movably interposed between the fellies 4, 4, I provide a preferably channeled rim 5 of annular formation with inwardly extending sides 6, 6, which is elastically supported in the manner hereinafter described and may be shod with a tire 7.

Mounted upon the laterally projecting end of one of the hub-sections 1, 1, I preferably provide, on one side of the wheel, a sprocket-wheel 8, which is constructed with an integrally formed hub 9 of smaller diameter adapted to set off the body-portion of the sprocket-wheel from the body of the vehicle-wheel, and a metal ring or collar 10. Similarly on the opposite side of the wheel I provide a ring or collar 11. The sprocket-wheel 8 and rings 10, 11, are secured in relative positions upon their respective hub-sections 1, 1, by a plurality of bolts 12, here shown as four in number, projected through suitable apertures provided therein and through the body of the vehicle-wheel including the alternate spokes in each wheel-section, which are thereby held in rigid relation to each other. Between the spokes of one wheel-section thus engaged by the bolts 12 and the corresponding spokes of the opposite wheel-section I provide a bushing or collar 13 on each of said bolts. Within the wheel and mounted upon the engaging inner ends of the hub sections 1, 1, is a bushing 14 extended between the sides of opposite wheel-sections.

Distributed within the rim tangentially thereto and at right angles to each other are four arms 15, as shown, constructed preferably of tubing. Said arms are disposed between opposite spokes of alternate pairs and at substantially right angles thereto and have their ends riveted or otherwise secured preferably to angle-irons 25 which are provided at either end with spaced lugs or feet 26 secured to opposite faces of the sides 6, 6, of the rim. As shown, each of the arms 15 is provided with coil-springs 16, 16, actuating in opposing relation two separate guide-blocks 17, 17, journaled on the arms centrally through their body-portions. Said guide-blocks are made in width substantially equal to the distance between the sides 6, 6, of the rim and are prevented from rotating on the arm 15 by the extended ends 18, 18, which project outwardly in engaging relation between the sides of the rim. The opposing faces of the guide-blocks have a V-shaped formation and are adapted to engage with corresponding recesses provided in the wedge-members or spreaders 19, 19, interposed therebetween and supported upon the opposite spokes 3 of alternate pairs. Said spreaders 19, 19, are rigidly attached to their respective spokes by screws 20, 21, engaging tapped apertures provided in their ends and suitable apertures provided through the spokes, the screws 21, which engage the inner ends of the spreaders, being also passed through the sprocket-wheel 8 and rings 10, 11, on respective sides of the wheel. A collar 22, carried by the screws 21 on one side of the wheel, is provided between the sprocket-wheel and the spokes.

For the protection of the rim-supporting means above described from dust and other foreign substances, I provide on either side of the wheel a dust-shield 23 interposed between the rim and felly and extending across the wheel. Said shields movably engage the sides 6 of the rim and are secured in position upon each wheel section by the several screws and bolts hereinbefore described. The diameter of the shields 23 is made somewhat less than that of the wheel-sections whereby I may further provide between the fellies 4 and the sides 6, 6, of the rim and in movable engagement with the rim a washer 24 of felt or other suitable substance adapted to set into an annular recess provided on the inner side of the felly beyond the perimeter of the shield 23.

It will be seen that the load upon the hub-sections causes a downward displacement thereof and of both wheel-sections. Assuming, by way of illustration, that the wheel rests upon the ground in the position shown in Fig. 1, this displacement draws the spreaders 19 on the vertical spokes downward thereby forcing the respectively engaging guide-blocks on either side apart and compressing the opposing springs 16. At the same time the spreaders on the horizontal spokes are drawn downward forcing the under guide-blocks downward in opposition to the lower section of springs 16. The load strain is thus elastically supported and effectively distributed among the several springs referred to. When the position of the rim is such that the spokes carrying the spreaders lie in diagonal lines the load will be distributed upon the several springs in proportion to the extent that their respective guide-blocks oppose the downward movement of the engaging spreaders. In whatever position the rim may be under load strain the forces displacing the wheel-sections will be distributed upon a plurality of springs, not less than four in number. The double-wedge formation of the spreaders serves to actuate the engaging guide-blocks whether moved toward or away from the rim. Hence, it should be observed, that the supporting mechanism of my device is divisioned into sections, each section forming a separate spring unit and comprising a pair of springs mounted upon a common support and having a common actuating member, the reaction of at least one of the springs in each of such units contributing toward the support of the load-strain in whatever direction the hub may be displaced. It will be further seen that the wheel-sections collectively and the rim are each capable of a limited rotary movement relatively to the other, such for example as would be imparted to the rim from the ground when the vehicle is first set in motion. This force would in the latter instance be communicated to and distributed upon the several springs through the rim.

Having thus described my invention, I claim as new and desire to secure by Letters Patent:—

1. In a wheel, the combination with a hub, dual series of radial spokes spaced relatively to each other and provided with separate fellies, and a rim movably interposed between the fellies, of means for maintaining the rim normally concentric to the hub and comprising a plurality of arms secured at opposite ends to the rim, a pair of sliding members carried on each of the arms, means for yieldingly opposing the sliding members to each other, and means provided on the spokes for spreading the sliding members apart in opposition to the resistance offered thereby when the hub and rim are moved relatively to each other.

2. In a wheel, the combination with a hub, and dual series of radial spokes spaced relatively to each other and provided with separate fellies, of a rim movably interposed between the fellies, and means for maintaining the rim normally concentric to the hub comprising a series of arms within the rim having their ends secured thereto, oppositely disposed sliding members carried on each of said arms, springs carried by said arms tending to actuate said sliding members toward each other, and means provided by the spokes for spreading said sliding members apart in opposition to the resistance offered by the springs when the hub and rim are moved relatively to each other.

3. In a wheel, the combination with a hub, a set of spokes, and a felly, of a separate set of spokes spaced relatively to the first mentioned set and having a separate felly, a movable rim supported independently of the fellies and means for maintaining the rim normally concentric to the hub comprising a plurality of arms rigidly secured to the rim, oppositely disposed sliding members carried by each of said arms, springs carried by said arms tending to actuate said sliding members toward each other, and a plurality of fixed members carried by the spokes and adapted to spread said sliding members apart when the hub and rim are moved relatively to each other, whereby the load-strain is distributed through the spokes upon some of the springs.

4. A wheel comprising two separate wheel-sections, each having a hub, a series of radial spokes and a felly and mounted in parallel upon a common axle, means for securing said wheel-sections in rigid relation to each other, a rim movably interposed between said wheel-sections, and means for elastically supporting the rim normally concentric to the axis of the wheel, comprising a plurality of arms secured to the rim, a pair of sliding members carried by each of said arms, springs carried by said arms causing said sliding members to yieldingly oppose each other, and a plurality of wedge members carried by the wheel-sections and adapted to spread said sliding members apart in opposition to the resistance offered by some of the springs when the rim and wheel-sections are moved relatively to each other.

5. A wheel comprising a hub, dual series of radial spokes and separate fellies spaced relatively to each other, means for securing said series of spokes in rigid relation to each other and in such manner that each of the spokes of one series is arranged opposite to a spoke in the other series, a rim movably interposed between the fellies, and means for elastically supporting the rim normally concentric to the axis of the wheel and comprising a plurality of arms secured to the rim, oppositely disposed blocks slidably journaled on each of said arms, coil springs carried by said arms causing said blocks to yieldingly oppose each other, and a series of wedge members rigidly secured between opposite spokes in such manner as to slidably interpose between the blocks carried on said arms and to spread the same apart in opposition to the resistance of the springs when the rim is moved relatively to the axis of the wheel, whereby the load-strain is distributed upon some of the springs.

In testimony whereof I hereto affix my signature in presence of two witnesses.

JAMES F. MIDDLETON.

Witnesses:
JNO. J. WHITTLESEY,
WILLIAM E. BAGG.

---

Copies of this patent may be obtained for five cents each, by addressing the "Commissioner of Patents, Washington, D. C."